US012598098B2

(12) United States Patent
Zhang et al.

(10) Patent No.: US 12,598,098 B2
(45) Date of Patent: Apr. 7, 2026

(54) METHODS, DEVICES AND APPARATUSES FOR COMMUNICATION, AND COMPUTER-READABLE MEDIUM

(71) Applicant: Nokia Solutions and Networks Oy, Espoo (FI)

(72) Inventors: Dong Xu Zhang, Shanghai (CN); Shuang Yao, Zhengzhou (CN); Chen Hui Ye, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 15 days.

(21) Appl. No.: 18/318,824

(22) Filed: May 17, 2023

(65) Prior Publication Data

US 2023/0379196 A1 Nov. 23, 2023

(30) Foreign Application Priority Data

May 20, 2022 (CN) .......................... 202210555309.1

(51) Int. Cl.
H04L 25/03 (2006.01)

(52) U.S. Cl.
CPC .. H04L 25/03828 (2013.01); H04L 25/03006 (2013.01)

(58) Field of Classification Search
CPC ......... H04L 25/03828; H04L 25/03006; H04L 25/4917; H04L 25/03859; H04Q 11/0062
See application file for complete search history.

(56) References Cited

U.S. PATENT DOCUMENTS

| | | | | |
|---|---|---|---|---|
| 5,249,200 A | * | 9/1993 | Chen ................. | H04L 25/03343 332/159 |
| 2006/0089832 A1 | * | 4/2006 | Ojanpera ................ | G10L 19/18 704/E19.041 |
| 2010/0124418 A1 | * | 5/2010 | Noble ................ | H04B 10/0779 398/9 |
| 2012/0058758 A1 | * | 3/2012 | Vaisanen .............. | H04B 17/309 455/424 |

(Continued)

FOREIGN PATENT DOCUMENTS

| | | | | | |
|---|---|---|---|---|---|
| EP | 3944521 A1 | * | 1/2022 | ............. | G06N 3/045 |

OTHER PUBLICATIONS

Machine translation of KR-20070091784-A (Year: 2007).*

(Continued)

*Primary Examiner* — Jean B Corrielus
(74) *Attorney, Agent, or Firm* — Harness, Dickey & Pierce, P.L.C.

(57) ABSTRACT

Examples of the present disclosure relate to a method, device and apparatus for communication, and a computer-readable medium. An example of the method includes: conducting, based on a channel response between a transmitter and a receiver, spectral shaping on a first sequence at the transmitter, so as to obtain an intermediate sequence, where the spectral shaping at least partially counters the channel response; remapping the intermediate sequence, so as to obtain a second sequence, where the second sequence has less signal levels than the intermediate sequence; and transmitting the second sequence to the receiver, so as to train an equalizer of the receiver. In this way, the method can accelerate training of the equalizer without sacrificing performance of the equalizer or introducing any additional hardware cost.

12 Claims, 7 Drawing Sheets

(56)          References Cited

U.S. PATENT DOCUMENTS

| | | | | |
|---|---|---|---|---|
| 2012/0299644 A1* | 11/2012 | Koren | .................. | H03G 3/3042 |
| | | | | 330/124 R |
| 2016/0248501 A1* | 8/2016 | Froc | ..................... | H04B 10/272 |
| 2017/0272281 A1* | 9/2017 | Kim | .................. | H04L 25/03012 |
| 2018/0083811 A1* | 3/2018 | Kumpula | .......... | H04L 25/03159 |
| 2019/0379357 A1* | 12/2019 | Kang | ................ | H04L 25/03019 |

OTHER PUBLICATIONS

Machine translation of KR-20070042099-A (Year: 2007).*
Machine translation of CN-1758642-B (Year: 2012).*
Machine translation of CN-102413386-A (Year: 2012).*
Machine translation of KR 20150125299 A (Year: 2015).*
ITU-T G.9804.3, "50-Gigabit-capable passive optical networks (50G-PON): Physical media dependent (PMD) layer specification," Telecommunication Standardization Sector of ITU, Sep. 2021.

ITU-T G.9804.2, "Higher speed passive optical networks—Common transmission convergence layer specification," Telecommunication Standardization Sector of ITU, Sep. 2021.
Tektronix, "Understanding the Transition to Gen4 Enterprise & Datacenter I/O Standards: Link Training, FEC, and Debugging Complicated Serdes," Whitepaper, pp. 1-14, 2017.
R. Harris, D. Chabries, and F. Bishop, "A variable step (VS) adaptive filter algorithm," IEEE Trans. Acoust., Speech, Signal Process., vol. 34, No. 2, pp. 309-316, Apr. 1986.
R. H. Kwong and E. W. Johnston, "A variable step size LMS algorithm," IEEE Trans. Signal Process., vol. 40, No. 7, pp. 1633-1642, Jul. 1992.
K. H. Mueller, "A new, fast-converging mean-square algorithm for adaptive equalizers with partial-response signaling," in The Bell System Technical Journal, vol. 54, No. 1, pp. 143-153, Jan. 1975.
G. Ungerboeck, "Theory on the Speed of Convergence in Adaptive Equalizers for Digital Communication," IBM J. Res. Develop., vol. 16, No. 6, pp. 546-555, Nov. 1972.

* cited by examiner

300

310

Estimate a channel response between
a transmitter and a receiver

320

Determine, based on the channel response, a filter parameter of
a filter, the filter being to be used by the transmitter for spectral
shaping, to at least partially counter the channel response

330

Transmit the filter parameter to the transmitter

METHODS, DEVICES AND APPARATUSES FOR COMMUNICATION, AND COMPUTER-READABLE MEDIUM

CROSS-REFERENCE TO RELATED APPLICATIONS

This application claims priority to and the benefit of Chinese Patent Application No. 202210555309.1 filed on May 20, 2022, the entire contents of each of which are incorporated herein by reference.

FIELD

Examples of the present disclosure relate to the field of communication, and particularly relate to methods, devices and apparatuses for communication, and a computer-readable medium.

BACKGROUND

As higher symbol rates are utilized in the high speed links including a serializer/deserializer (SerDes), a backplane and an optical transmission system to meet the ever-increasing demand of data traffic, to overcome intersymbol interference (ISI) induced by the limited bandwidth of physical layer components (for example, an electrical amplifier, a digital-to-analog converter (DAC) and a photodetector) has become increasingly crucial.

Adaptive channel equalization based on digital signal processing (DSP) is an effective solution for the inter-symbol interference. In an existing equalizer training technology, if a channel is with severe distortion, may cause an extremely low convergence speed (that is, more iterations are required to optimize convergence). This will lead to unsuccessful or long-time link-setup, as well as high transmission overhead for training.

SUMMARY

Generally, illustrative embodiments of the present disclosure relate to a technical solution for improving training of an equalizer.

In a first aspect of the present disclosure, there is provided a method for communication. The method comprises: conducting, at a transmitter and based on a channel response between a transmitter and a receiver, spectral shaping on a first sequence, to obtain an intermediate sequence, the spectral shaping at least partially countering the channel response; remapping the intermediate sequence, to obtain a second sequence, the second sequence having less signal levels than the intermediate sequence; and transmitting the second sequence to the receiver, to train an equalizer of the receiver.

In a second aspect of the present disclosure, there is provided a method for communication. The method comprises: estimating, at a receiver, a channel response between a transmitter and the receiver; determining based on the channel response, a filter parameter of a filter, the filter being to be used by the transmitter for spectral shaping, to at least partially counter the channel response; and transmitting the filter parameter to the transmitter.

A third aspect of the present disclosure, there is provided a device for communication. The device comprises: at least one processor; and at least one memory coupled to the at least one processor, the at least one memory comprising instructions stored thereon; and the at least one memory and instructions stored thereon; and the at least one memory and the instructions are further configured, with the at least one processor, to cause the device to perform the method according to the first aspect.

A fourth aspect of the present disclosure, there is provided a device for communication. The device comprises: at least one processor; and at least one memory coupled to the at least one processor, the at least one memory comprising instructions stored thereon; and the at least one memory and the instructions are further configured, with the at least one processor, to cause the device to perform the method according to the second aspect.

A fifth aspect of the present disclosure, there is provided an apparatus for communication. The apparatus comprises: means for conducting, based on a channel response between a transmitter and a receiver, spectral shaping on a first sequence, to obtain an intermediate sequence, the spectral shaping at least partially countering the channel response; means for remapping the intermediate sequence, to obtain a second sequence, the second sequence having less signal levels than the intermediate sequence; and means for transmitting the second sequence to the receiver, to train an equalizer of the receiver.

A sixth aspect of the present disclosure, there is provided an apparatus for communication. The apparatus comprises: means for estimating a channel response between a transmitter and a receiver; means for determining, based on the channel response, a filter parameter of a filter, wherein the filter being to be used by the transmitter for spectral shaping, to at least partially counter the channel response; and means for transmitting the filter parameter to the transmitter.

A seventh aspect of the present disclosure, there is provided a computer-readable medium storing instructions. When the instructions are executed by at least one processing unit, cause the at least one processing unit to be configured to perform the method according to the first aspect.

An eighth aspect of the present disclosure, there is provided a computer-readable medium storing instructions. When the instructions are executed by at least one processing unit, cause the at least one processing unit to be configured to perform the method according to the second aspect.

It should be understood that the content described in the summary of the invention is neither intended to limit key or important features of examples of the present disclosure, nor intended to limit the scope of the present disclosure. Other features of the present disclosure will be comprehensible through the following description.

BRIEF DESCRIPTION OF THE DRAWINGS

In all the drawings, the same or similar reference numerals denote the same or similar elements.

DETAILED DESCRIPTION OF EMBODIMENTS

Figure 1:
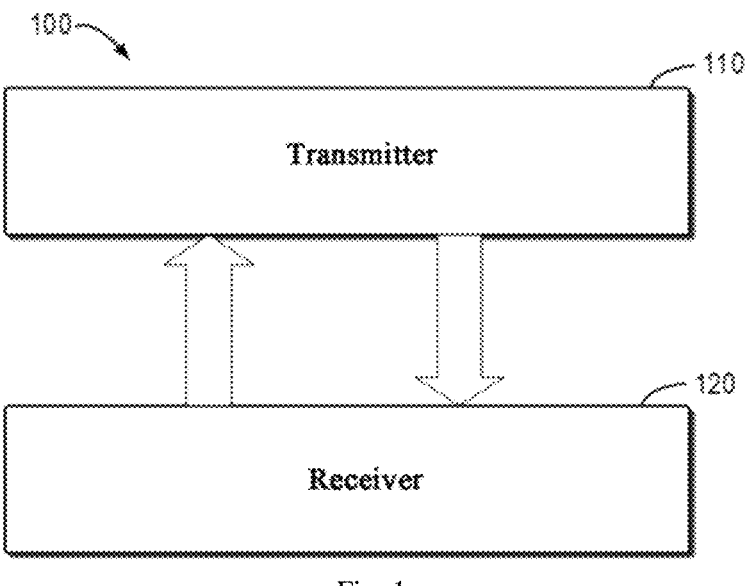
FIG. 1 shows a block diagram of an illustrative communication system in which an example of the present disclosure is implementable.

The principle and spirit of the present disclosure will be described below with reference to several illustrative examples shown in the accompanying drawings. It should be understood that the specific embodiments are described only to enable those skilled in the art to better understand and implement the present disclosure, and are not intended to limit the scope of the present disclosure in any way.

The term "include" and "comprise" used herein and similar terms should be understood as open inclusion, that is, "including but not limited to" and "comprising but not limited to". The term "based on" should be understood as "at least partly based on." The terms "an example" or "the example" should be understood as "at least one example." The terms "first", "second", etc. may refer to different or the same objects. Other explicit and implicit definitions may be included below. It should be noted that all specific values described herein are illustrative and are not intended to limit the scope of the present disclosure in any way. In other examples of the present disclosure, the specific values may be changed without departing from the scope of the present disclosure.

As used herein, the term "determine" covers a wide variety of actions. For example, "determine" may include operating, computing, processing, exporting, inquiry, looking up (for example, looking up in a table, a database, or another data structure), finding, etc. In addition, "determine" may include receiving (for example, receiving information), accessing (for example, accessing data in a memory), etc. In addition, "determine" may include parsing, choosing, selecting, establishing, etc.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit or a similar integrated circuit in OLT, or other computing device.

FIG. 1 shows a block diagram of an illustrative communication system 100 in which an embodiment of the present disclosure is implementable. As shown in FIG. 1, the communication system 100 comprises a transmitter 110 and a receiver 120, which may conduct communication via a communication channel. For example, in some embodiments, the communication channel between the transmitter 110 and the receiver 120 may comprise a fiber communication channel. In some other embodiments, the communication channel between the transmitter 110 and the receiver 120 may also be any wired or wireless channel in other forms.

It should be noted that the embodiments of the present disclosure may be generally applied to any communication system for communication by using the transmitter and the receiver. For example, in some embodiments, the communication system 100 may be a part of a passive optical network (PON). In such embodiments, the transmitter 110 and the receiver 120 may be associated with an optical network unit (ONU) and an optical line terminal (OLT) in the PON, respectively. In some other embodiments, the communication system 100 may be a part of a datacenter. In such embodiments, the transmitter 110 and the receiver 120 may be associated with an input/output (I/O) interface of the datacenter.

In addition, it should be noted that the transmitter 110 is assumed to transmit a training signal (or a training sequence) to the receiver 120 in a scenario of the embodiment of the present disclosure. Further, the receiver 120 may train an equalizer or similar components at the receiver 120 by using the training signal. After training of the equalizer or similar components is completed, the transmitter 110 may transmit a communication signal to the receiver 120, and the receiver 120 may correctly receive the communication signal transmitted from the transmitter 110. Therefore, for convenience of description, in the description of the present disclosure, the side that transmits the training signal is referred to as the "transmitter" and the side that receives the training signal is referred to as the "receiver", which does not mean that the transmitter mentioned in the present disclosure is only used for transmission while the receiver is only used for reception. In some cases, the receiver 120 of the present disclosure may also transmit information or a signal to the transmitter 110.

In order to compensate signal impairment due to restricts of bandwidth limitation or/and fiber propagation, adaptive equalization is adopted in the receiver-side. However, if a channel is with severe distortion, a convergence speed of training of the equalizer may be very slow, resulting in failure or long time of link-setup and high transmission overhead for training. In view of this, an embodiment of the present disclosure provides a technical solution for improving training of the equalizer. The example of the present disclosure will be described in detail below based on FIGS. 2-12.

Figure 2:
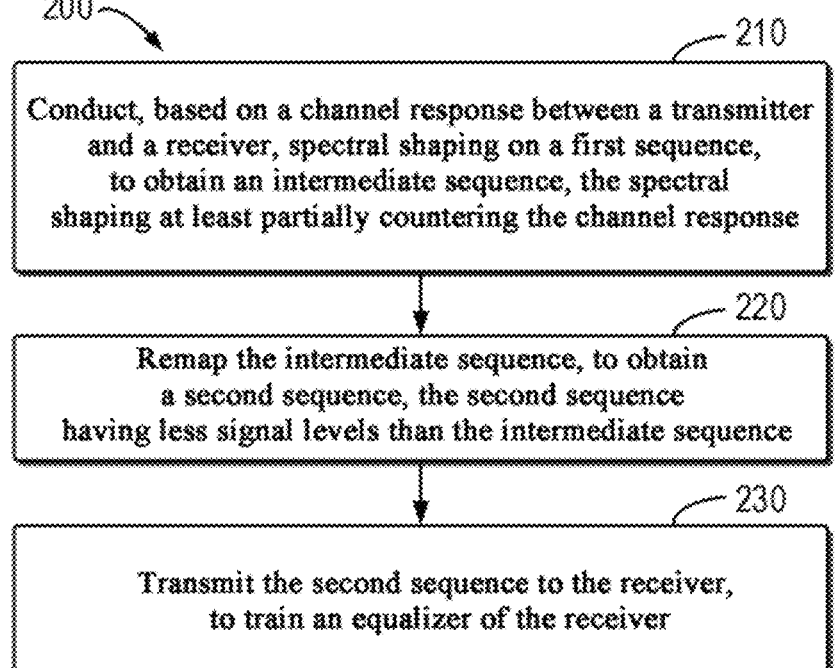
FIG. 2 shows a schematic diagram of a method for communication according to some embodiments of the present disclosure.

FIG. 2 shows a schematic diagram of a method for communication according to some embodiments of the present disclosure. As shown in FIG. 2, the method 200 may be implemented at a transmitter 110.

In block 210, spectral shaping on a first sequence is conducted, based on a channel response between the transmitter 110 and a receiver 120, to obtain an intermediate sequence. The spectral shaping at least partially counters the channel response.

In block 220, the intermediate sequence is remapped, to obtain a second sequence. The second sequence has less signal levels than the intermediate sequence. That is, the number of signal levels of the second sequence may be any number smaller than the number of signal levels of the intermediate sequence.

In block 230, the second sequence is transmitted to the receiver 120, to train an equalizer of the receiver 120.

The method 200 may assist acceleration in training of the equalizer of the receiver at a transmitter-side without sacrificing performance of the equalizer or introducing any additional hardware cost.

In some examples, in order to conduct spectral shaping on the first sequence, the transmitter 110 may filter the first sequence by using a filter. The filter for spectral shaping may have a filter parameter determined based on the channel response between the transmitter 110 and the receiver 120. In this way, spectral shaping at the transmitter 110 may reduce a signal spectrum dynamic range at the receiver by countering bandwidth distortion.

In some examples, the transmitter 110 may receive the filter parameter from the receiver 120.

The receiver 120 estimates the channel response, to determine the filter parameter, and the filter parameter is received at the transmitter 110, such that a shape of the filter of the transmitter 110 is approximate to the channel response.

In some embodiments, the transmitter 110 receives the filter parameter from the receiver 120. Specifically, an index in a look-up table may be received from the receiver 120, and the filter parameter may be determined based on the look-up table and the index. The look-up table may be pre-stored in the transmitter 110 and the receiver 120.

Through the above method, only the index needs to be transmitted, such that communication cost may be reduced.

In some examples, in a process of remapping the intermediate sequence to obtain the second sequence by the transmitter 110, a first signal level set of the first sequence and a second signal level set of the intermediate sequence may be determined first, and then each signal level in the second signal level set may be rounded to a signal level in the first signal level set. That is, in such embodiments, the number of signal levels of the second sequence may be the same as that of signal levels of the first sequence.

The intermediate sequence is remapped to obtain the second sequence at the transmitter 110, such that signals having a uniform probability and a non-flat spectrum may be generated to achieve efficient equalizer convergence, and use of expensive high-resolution digital-to-analog converters may be avoided.

In some embodiments, the first sequence and the second sequence may be pulse amplitude modulation (PAM) sequences having a first number of signal levels. In this case, the intermediate sequence may be a sequence having a second number of signal levels, where the second number is greater than the first number.

In some examples, the transmitter 110 and the receiver 120 are associated with an optical network unit (ONU) and an optical line terminal (OLT) in a passive optical network (PON), respectively.

In some examples, the transmitter 110 and the receiver 120 are associated with an input/output (I/O) interface of a datacenter.

Figure 3:
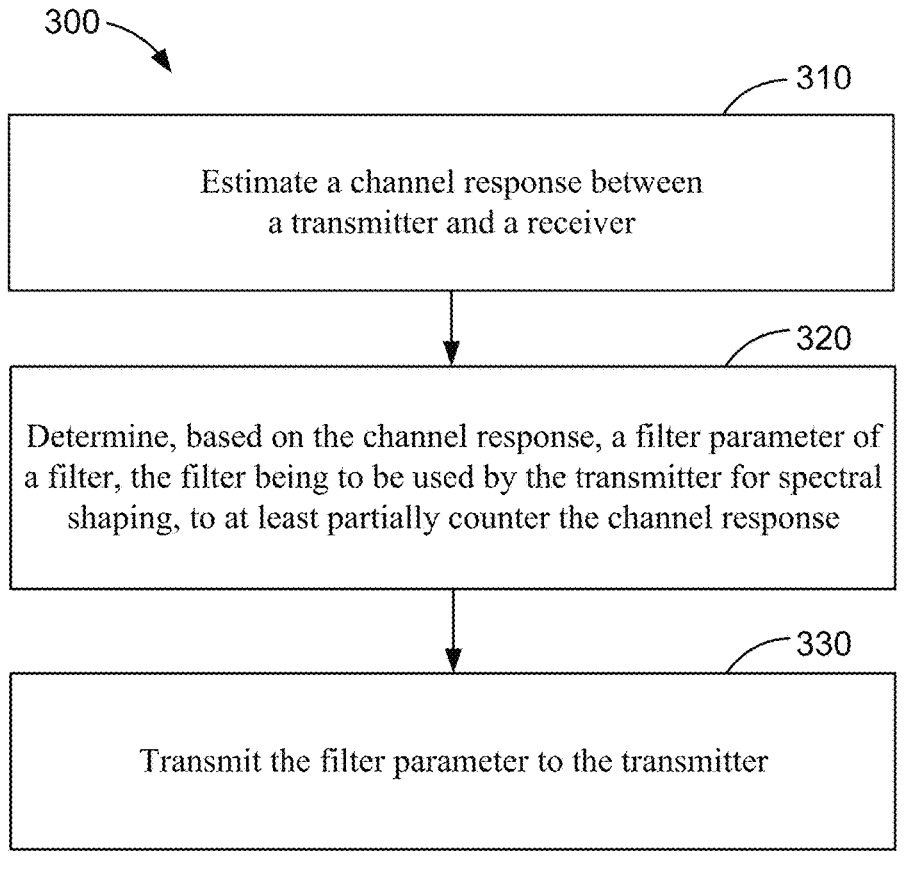
FIG. 3 shows a schematic diagram of a method for communication according to some embodiments of the present disclosure.

FIG. 3 shows a schematic diagram of a method for communication according to some embodiments of the present disclosure. As shown in FIG. 3, the method 300 may be implemented at a receiver 120.

In block 310, a channel response between a transmitter 110 and a receiver 120 is estimated.

In block 320, a filter parameter of a filter is determined based on the channel response, where the filter being to be used by the transmitter 110 for spectral shaping, to at least partially counter the channel response.

In block 330, the filter parameter is transmitted to the transmitter 110.

The method 300 may accelerate training of an equalizer of the receiver without sacrificing performance of the equalizer or introducing any additional hardware cost.

In some examples, in order to estimate the channel response, the receiver 120 may determine a component bandwidth of an optical network unit (ONU) based on a serial number of the ONU associated with the transmitter 110 in a passive optical network (PON). Alternatively or additionally, the receiver 120 may determine, based on a ranging result of the ONU by an optical line terminal (OLT) associated with the receiver 120 in the PON, a fiber length between the OLT and the ONU.

In some examples, in order to estimate the channel response, the receiver 120 may determine, based on factory calibration data of the receiver 120 associated with an input/output (I/O) interface of a datacenter, a component bandwidth and an S parameter of the receiver 120. Alternatively or additionally, the receiver 120 may determine, based on factory calibration data of the transmitter 110 associated with the I/O interface, a component bandwidth and an S parameter of the transmitter 110.

In some examples, the receiver 120 may transmit the filter parameter to the transmitter 110 as follows: the receiver 120 determines, based on the filter parameter, an index indicating the filter parameter in a look-up table, and transmits the index to the transmitter 110, where the look-up table is pre-stored in the transmitter 110 and the receiver 120.

In some examples, the equalizer may be an equalizer based on a least mean square (LMS) algorithm, which is referred to as a LMS equalizer for short. LMS, an iterative algorithm, is used to minimize a mean square error (MSE) between an equalized signal and a target signal (also referred to as a preamble) through a gradient descent operation. Because of simplicity and low computational complexity, the LMS is widely used to adjust a tap coefficient. However, as pointed out by various standards, training of the equalizer, which is indispensable for successful data transmission, has a great influence on a link-setup stage. A convergence speed of the LMS algorithm determines a length of a training sequence to a great extent, which constitutes an important part of transmission overhead.

At present, most solutions of accelerating training of the equalizer based on LMS are implemented at a receiver-side. One method is to optimize LMS training by using a learning rate scheduler (LRS). The method may also be referred to as variable-step-size LMS or variable-speed LMS, in which a learning rate decreases with increase in the number of training cycles. At the beginning, training of the equalizer is accelerated at a high learning rate, and at the same time, a lower limit of a mean square error (MSE) is reduced, so as to ensure performance of the equalizer with a low learning rate after initial convergence. Another method is to use different learning rates or step sizes for different taps. However, the learning rate or step size is generally chosen based on a channel condition and an equalizer configuration, so the learning rate or step size is always difficult to correctly choose.

The embodiment of the present disclosure is a solution to accelerate training of the equalizer at the transmitter 110. Specifically, a second sequence, regarded as an equalizer training sequence, is generated at the transmitter 110, to train the equalizer of the receiver 120. In this way, convergence of the LMS algorithm may be accelerated without introducing additional hardware. The solution may be applied to the existing transmitter 110 with little modification.

In some examples, the method (for example, the method 200) implemented at the transmitter 110 according to the embodiment of the present disclosure may be used in combination with the above-mentioned existing solution, implemented at the receiver-side, of accelerating training of the equalizer.

In some other examples, the method (for example, the method 200) implemented at the transmitter 110 according to the example of the present disclosure may be used independently of the existing solution, implemented at the receiver-side, of accelerating training of the equalizer.

The method according to the example of the present disclosure is a promising solution for high-speed links.

Figure 4:
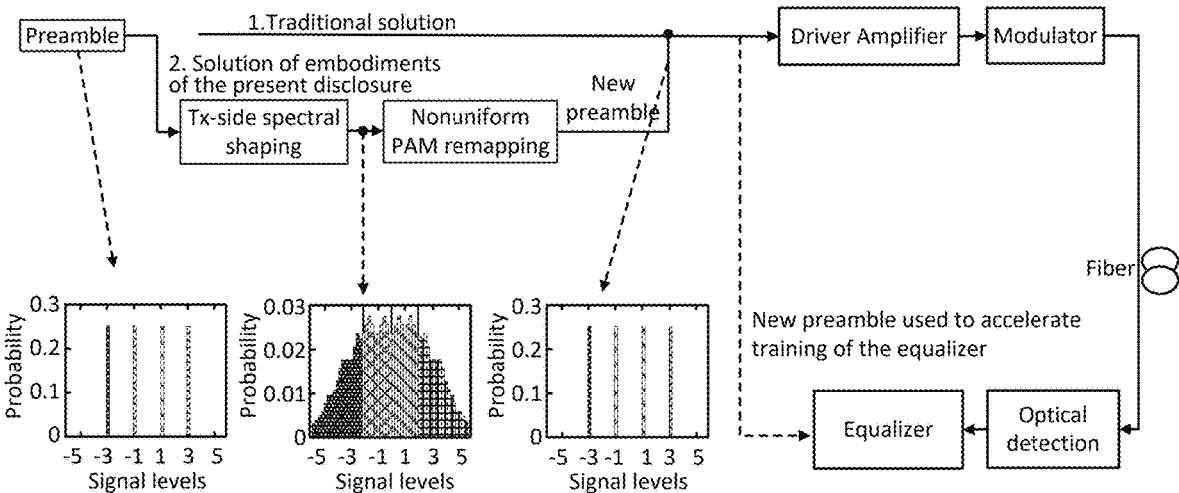
FIG. 4 shows a schematic flow diagram of an illustrative method according to an embodiment of the present disclosure.

FIG. 4 shows a schematic flow diagram of an illustrative method according to an embodiment of the present disclosure. The method comprises a preamble preprocessing flow and a flow of obtaining a new preamble after preprocessing and transmitting the new preamble to the receiver 120 (as indicated by a solid arrow). The preprocessing flow is specifically a process of preprocessing an original preamble (including spectral shaping and remapping) to obtain the new preamble. The original preamble is the first sequence, and may be obtained based on pseudorandom binary sequences (PRBSs). The PRBS is a pseudorandom sequence that may be generated by a PRBS pattern generator. The new preamble is the second sequence. Through the preprocessing flow, the second sequence for training of the equalizer is generated.

In a traditional solution, the original preamble is directly fed into a fiber link, to be transmitted to the receiver 120. The transmitter 110 of the embodiment of the present disclosure conducts a series of preprocessing operations on the original preamble, comprising spectral shaping and remapping. Spectral shaping and remapping are two cascaded functions in the embodiment of the present disclosure. Through spectral shaping, original level distribution of PAM symbols of the original preamble may be expanded to distribution of a plurality of discrete levels. Further, after remapping, discrete PAM levels distributed uniformly are generated, and the new preamble preprocessed is obtained.

The convergence speed of training of the equalizer based on LMS depends on a signal spectrum dynamic range input from the equalizer. When the spectrum dynamic range is large, convergence may be achieved only after repeated iterations. If a system deploys the transmitter 110 or the receiver 120 having severe bandwidth distortion, repeated iterations are required. In the embodiment of the present disclosure, a first step of spectral shaping of the transmitter 110 is to reduce the spectrum dynamic range at the receiver by countering bandwidth distortion. For example, if a transceiver introduces large attenuation at a high frequency, spectral shaping should emphasize high-frequency signals. Spectral shaping may expand level distribution of the preamble, and a level distribution range increases exponentially with a length of the filter, such that a peak-to-average power ratio (PAPR) is increased, and a high-resolution digital-to-analog converter is required to transmit the signal. Therefore, in order to avoid usage of expensive high-resolution digital-to-analog converters, the embodiment of the present disclosure introduces a second step of PAM remapping, to round the signal to a most nearest PAM level. It should be noted that an objective of spectral shaping at a transmitting side in the embodiment of the present disclosure is to shape a spectrum at the transmitter 110 to promote rapid convergence, rather than completely eliminating inter-symbol interference (ISI) through pre-emphasis, so the spectral shaping does not depend on accurate estimation of the channel response. In view of this, information such as a serial number of an ONU (meaning specifications comprising a bandwidth response) and a ranging result is already helpful.

Specifically, in a time division multiplexing (TDM) passive optical network (PON), the serial number and the ranging result of the optical network unit (ONU) may be used to extract information such as a component bandwidth and a fiber length.

In some embodiments, the ONU associated with the transmitter 110 in the PON may report a serial number every time the ONU is started, and an optical line terminal (OLT) may estimate the channel response according to the serial number, that is, determine the component bandwidth of the ONU, so as to obtain a set of tap coefficients of the filter.

In some examples, a fiber length between an optical line terminal (OLT) associated with the receiver 120 in the PON and the ONU may be determined based on a ranging result of the ONU by the OLT, so as to obtain a set of tap coefficients of the filter.

In some examples, a predefined function may be used, the serial number of the ONU is regarded as input of the function, and output of the function is a set of tap coefficients. A mapping relation in the function may be set through testing before a device leaves the factory. For example, the function may be defined based on a corresponding relation between a device response of the ONU and a tap coefficient.

In addition, in an electrical input/output (I/O) interface, factory calibration data may be used to extract information such as the component bandwidth and the S parameter of the transceiver.

In some embodiments, a component bandwidth and an S parameter of the receiver 120 are determined based on factory calibration data of the receiver 120 associated with an input/output (I/O) interface of a datacenter, so as to obtain a tap coefficient of the filter.

In some embodiments, a component bandwidth and an S parameter of the transmitter 110 are determined based on factory calibration data of the transmitter 110 associated with the I/O interface of the datacenter, so as to obtain a tap coefficient of the filter.

The embodiment of the present disclosure may further assist choice of an appropriate filter configuration through a look-up table or neural network.

For example, in some examples, the look-up table may be pre-stored in the transmitter 110 and the receiver 120, the look-up table may be predefined by the transmitter-side and the receiver-side, and the look-up table includes a filter parameter and an index indicating the filter parameter. For example, each item stores the filter parameter based on a combination of a component bandwidth and a fiber length, and specifically, the filter parameter may be the tap coefficient of the filter. Because mapping of the channel condition to the filter configuration is predefined through the above method, when the receiver 120 transmits the filter parameter to the transmitter 110, the receiver may only transmit the index of the filter parameters, such that communication cost is reduced.

As shown in FIG. 4, the new preamble is transmitted to the receiver 120 as follows: the new preamble passes a driver amplifier, a modulator, a fiber, and an optical detection, and reaches the equalizer of the receiver 120, such that training of the equalizer is accelerated by using the new preamble.

An important illustrative application scenario of the LMS equalizer is the passive optical network. For TDM PON uplink transmission, different ONUs continuously transmit optical bursts to the OLT, and each optical burst has a preamble sequence attached to a frame header. An OLT side requires an efficient adaptive equalizer, to recover the optical burst input. In the instance, the ONU is associated with the transmitter 110, and the OLT is associated with the receiver 120. When the OLT side requires the efficient adaptive equalizer, to recover the optical burst input, long LMS convergence time may directly lead to high frame overhead.

Figure 5:
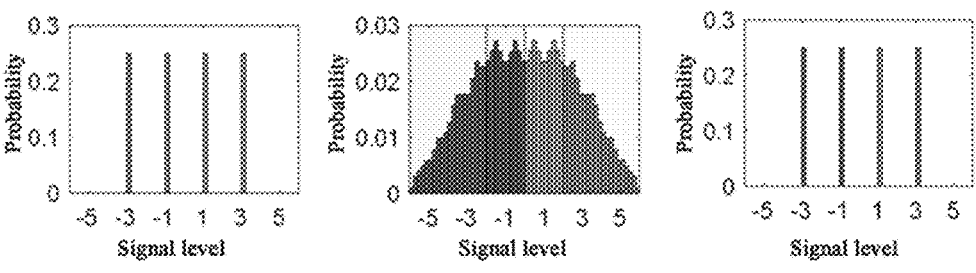
FIG. 5 shows a schematic diagram of equalizer overhead according to an embodiment of the present disclosure.

As shown in FIG. 5, equalizer overhead is described, which concretely reflects a timing relation of overhead time of all physical layers. The physical layer overhead time $T_{plo}$ is used to accommodate five physical processes in the PON, which are laser on/off time, timing drift tolerance, level recovery, clock recovery, and start of burst delineation. The physical layer overhead time $T_{plo}$ includes three parts about transmission in which ONU data mode. The parts may be referred to as guard time $T_g$, preamble time $T_p$, and delimiter time $T_d$, and thus following $T_{plo} \geq T_g + T_p + T_d$. During $T_g$, power transmitted by the ONU cannot exceed a nominal zero level. During $T_p$, the ONU may transmit a preamble pattern, which provides a desired transition density and a signal pattern for fast level adjustment, clock recovery and optional equalization functions. Lastly, during $T_d$, the ONU may transmit a special data pattern, a delimiter with optimal autocorrelation properties that enables the OLT to find a beginning of a burst payload.

Another parameter of a control logic on the PON is total peak-to-peak timing uncertainty $T_u$, which is arises from variations of the time of flight caused by the fiber and component variations with temperature and other environmental factors. In this way, the constraint conditions with which the OLT must comply are then: $T_g > T_{on} + T_u$, and $T_g > T_{off} + T_u$. The first condition makes sure that the following burst's laser on ramp-up does not fall on top of the last burst's data, and the second condition makes sure that the last burst's laser off tail-off does not fall on top of the following burst's preamble.

The method according to the embodiment of the present disclosure may reduce the preamble time $T_p$, and further reduce a length of the preamble overhead, which is conducive to faster training of the equalizer at the receiver-side.

Another illustrative scenario of the LMS equalizer is the I/O interface of the datacenter. The LMS equalizer is required to counter the channel response and adapt to various transmitters 110 and receivers 120 of different manufacturers and operating conditions achieved during link training A low convergence speed may lead to long-link training and low-rate operation if training fails within maximum training time.

In some examples, in order to estimate the channel response, the component bandwidth and the S parameter of the receiver 120 may be determined based on the factory calibration data of the receiver 120 associated with the I/O interface of the datacenter, and/or, the component bandwidth and the S parameter of the transmitter 110 are determined based on the factory calibration data of the transmitter 110 associated with the I/O interface, so as to determine the filter parameter, further the filter used for the transmitter 110 conducts spectral shaping on the original preamble, and then the second sequence for training of the equalizer of the receiver 120 is obtained through remapping. In this way, the above problems of the low convergence speed, long link training time and low-rate operation may be solved.

Figure 6:
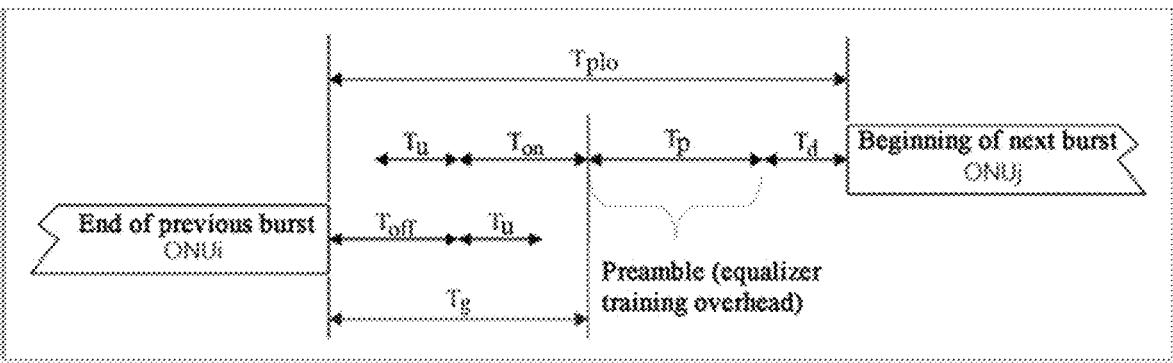
FIG. 6 shows schematic diagrams of signal level distribution changes in a preamble preprocessing flow according to an embodiment of the present disclosure.

FIG. 6 shows schematic diagrams of signal level distribution changes in a preamble preprocessing flow according to an embodiment of the present disclosure. FIG. 6 conducts illustration with a 4-level pulse amplitude modulation (PAM4) signal as an example. It should be noted that the embodiment of the present disclosure is also applicable to a higher-order PAM signal. According to FIG. 6, level distribution of an original preamble is expanded after spectral shaping, and then PAM remapping (non-uniform PAM remapping) is conducted. Specifically, four set thresholds may be used to round each signal level in a second signal level set of an intermediate sequence to a signal level in a first signal level set of a first sequence in the intermediate sequence obtained after spectrum shaping, such that a corresponding 4-level PAM signal is regenerated to generate discrete PAM4 levels distributed uniformly.

In some embodiments, the transmitter 110 preprocesses an original preamble into a new preamble sequence, that is, a second sequence through the above processing. A training function of the equalizer at the receiver 120 may remain unchanged, and a training sequence received by the receiver 120 from the transmitter 110 is not the original preamble but the second sequence obtained after preprocessing of the transmitter 110 according to the embodiments of the present disclosure.

In some other embodiments, the receiver 120 of the embodiment of the present disclosure may provide a new function different from functions of the existing receiver 120. Specifically, the receiver 120 may determine the filter parameter of the filter used for the transmitter 110 and transmit the filter parameter to the transmitter 110, such that spectral shaping is conducted with the filter by the transmitter 110.

The shape of the filter at the transmitter 110 may be pre-designed to be approximate to a channel response. In some examples, the channel response may be used as a tap coefficient of the filter.

Figure 7:
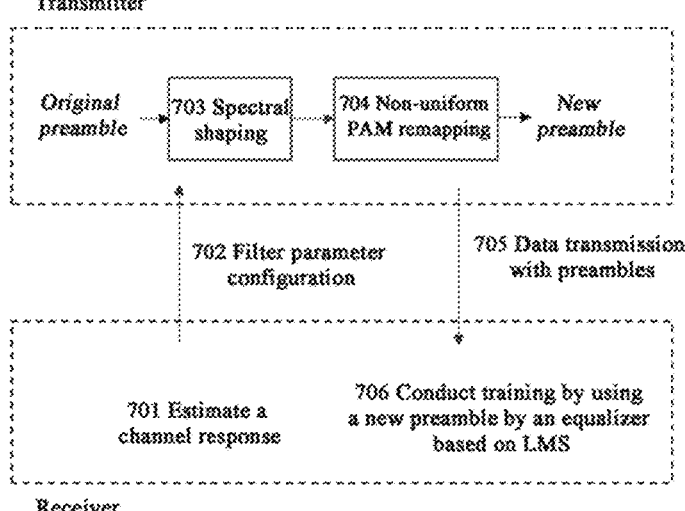
FIG. 7 shows a schematic flow diagram of an illustrative system for training an equalizer according to an embodiment of the present disclosure.

FIG. 7 shows a schematic flow diagram of an illustrative system for training an equalizer according to an example of the present disclosure. As shown in FIG. 7, an original channel response is estimated first (701). For example, in a time division multiplexing PON, a serial number and a ranging result of an ONU may be used to extract information such as a component bandwidth and a fiber length. Further, for example, in an electrical I/O interface, factory calibration data may be used to extract information such as a component bandwidth and an S parameter of a transceiver. A receiver 120 configures a filter parameter according to a channel response estimation result. Specifically, a filter configuration strategy may be predefined by a transmitting end and the receiver-side. For example, a filter coefficient of a combination of a component bandwidth and a fiber length may be stored in each item of a look-up table by using the look-up table. Because mapping of a channel condition to a filter parameter configuration is predefined, communication may be conducted on only an item index. The transmitter 110 obtains the filter parameter configuration from the receiver 120 (702). The transmitter 110 filters an original preamble by using a filter, so as to conduct spectral shaping (703). The filter coefficient of the filter is determined by the receiver 120 according to the filter parameter configuration, and the filter conducts spectral shaping on the original preamble, so as to expand level distribution of the original preamble. Remapping is conducted according to a predefined non-uniform PAM remapping strategy (704), so as to regenerate a new PAM sequence. Further a second sequence is obtained, which is a new preamble. If a first sequence is a PAM4 sequence, the second sequence is also a PAM4 sequence, that is, the number of signal levels of the first sequence is the same as that of signal levels of the second sequence. After the remapping step, probability distribution of signals may still be uniform, such that the second sequence generated has the same peak-to-average power ratio (PAPR) as a first original sequence. The transmitter 110 transmits data including the second sequence (that is, a new preamble) to the receiver 120 (705). An equalizer based on LMS of the receiver 120 uses the new preamble as a training sequence for training (706).

The first sequence may be a pseudorandom binary sequence (PRBS).

The embodiment of the present disclosure may not be limited to the above-mentioned PON, and is applicable to other networks or systems involving a high bandwidth and requiring training of an equalizer.

Spectral shaping and non-uniform PAM remapping at the transmitter-side according to the embodiment of the present disclosure are conducive to faster training of the equalizer at a receiver-side. Compared with a solution of directly feeding the original preamble sequence into a fiber link, the example of the present disclosure may reduce length of preamble overhead. Non-uniform PAM remapping may reduce the number of amplitude levels after spectral shaping, which preserves the low PAPR of an original signal and effectively shapes a spectrum, so as to accelerate training of the equalizer at the receiver-side. The example of the present disclosure may be compatible with hardware of the existing transmitter 110 without introducing additional cost of a digital-to-analog converter, etc. In addition, a difference between an equalization coefficient trained in the example of the present disclosure and an equalization coefficient trained by an equalizer by using the original preamble is negligible. The example of the present disclosure may achieve a desirable training effect.

Figure 8:
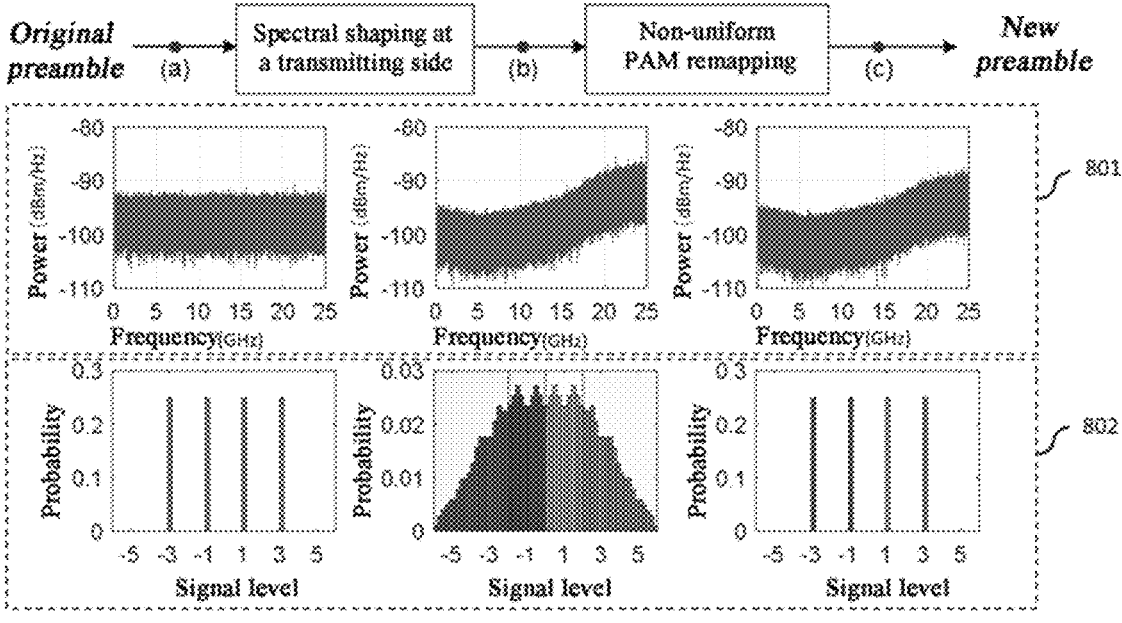
FIG. 8 shows a schematic comparison diagram between signal power spectrum densities and signal statistical histograms according to an embodiment of the present disclosure.

FIG. 8 shows a schematic comparison diagram between signal power spectral densities and signal statistical histograms according to an embodiment of the present disclosure. As shown in FIG. 8, a filter h=[1,−0.5,0.3,−0.1,0.05,0.02] and 50 Gbaud PAM4 signals are used as an instance. A signal at point a is an original preamble (that is, a first sequence), which is specifically a pseudorandom binary sequence (PRBS). A signal at point b is a signal obtained by conducting spectral shaping on the original preamble, that is, an intermediate sequence. A signal at point c is a signal after PAM regeneration, that is, a second sequence. In block 801, there are three signal power spectrum density (PSD) diagrams, which correspond to the signals at the points a, b and c from left to right, respectively. In block 802, there are three signal statistical histograms, which correspond to the signals at the points a, b and c from left to right, respectively. The PRBS has a flat spectrum and a uniform probability, but cannot remain unchanged when undergoing spectral shaping. When the spectrum is shaped, a signal level increases accordingly. In the next step, a PAM sequence is regenerated through rounding, and further a signal having a uniform probability and a non-flat spectrum is generated for efficient equalizer convergence.

Figure 9:
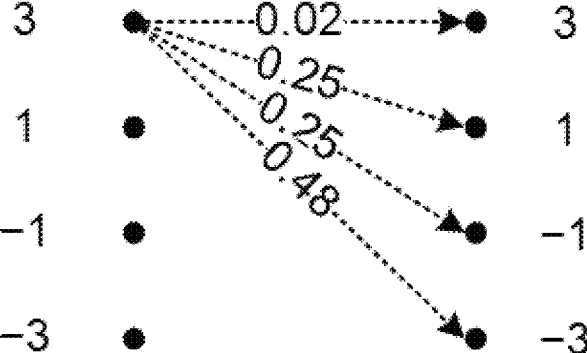
FIG. 9 shows a schematic diagram of a transition probability of a second sequence according to an embodiment of the present disclosure.

FIG. 9 shows a schematic diagram of a transition probability of a second sequence according to an embodiment of the present disclosure.

According to the embodiment of the present disclosure, a first sequence is filtered at a transmitter 110, such that a transition probability of a second sequence finally obtained is inconsistent due to filtering. As shown in FIG. 9, for a sequence {3,1,−1,−3}, a transition probability is highest from 3 to −3 and lowest from −3 to 3. It should be noted that a specific probability value shown in FIG. 9 is only illustrative and is not intended to limit the scope of the present disclosure in any way.

In order to describe advantages of embodiments of the present disclosure compared with a traditional solution more clearly, the traditional solution using an original preamble will be compared with a solution of training by using a new preamble (that is, a second sequence) according to an embodiment of the present disclosure from a plurality of dimensions below. The traditional solution using the original preamble refers to a solution of directly using the original preamble for training of an equalizer of a receiver 120, which is referred to as the traditional solution for short.

Figure 10:
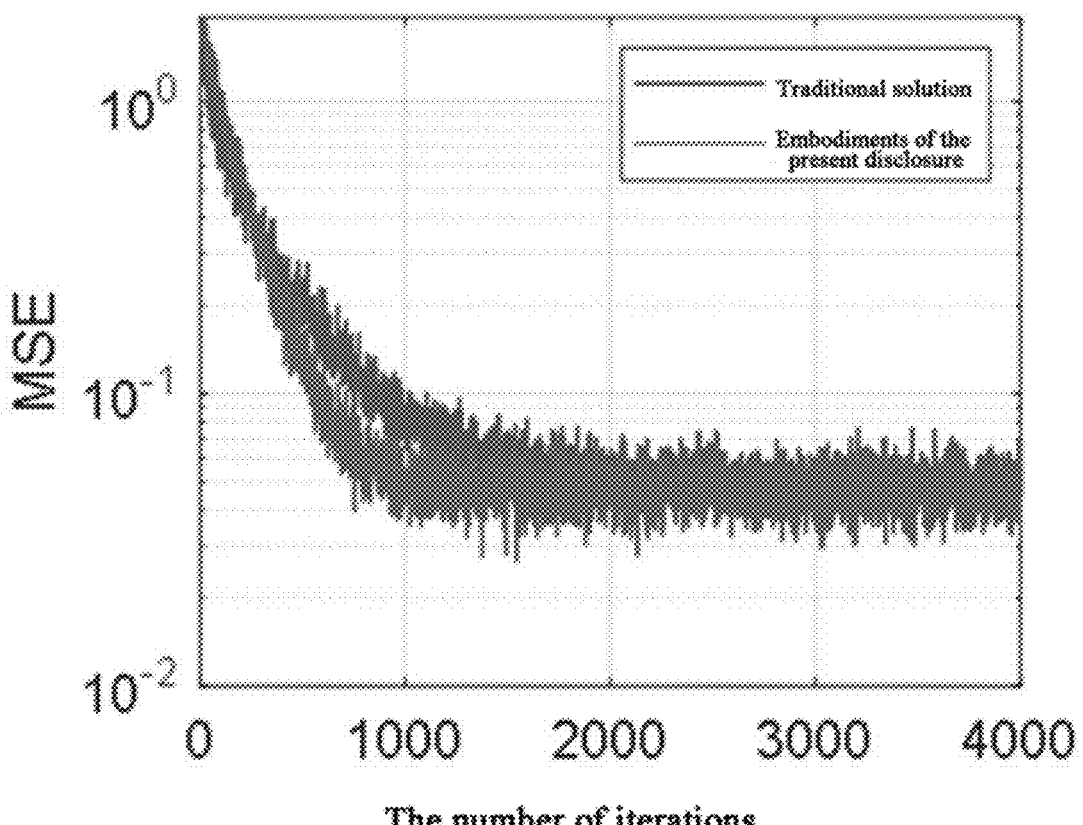
FIG. 10 shows a schematic comparison diagram of a convergence speed of training of an equalizer according to an embodiment of the present disclosure and a traditional solution.

FIG. 10 shows a schematic comparison diagram of a convergence speed of training of an equalizer according to an embodiment of the present disclosure and a traditional solution. In FIG. 10, an abscissa represents the number of iterations, and an ordinate represents a mean square error (MSE). It may be seen from FIG. 10 that the example of the present disclosure has a higher convergence speed by using a new preamble. In order to reach a lower limit of a minimum mean square error, the number of iterations may be reduced by about half.

Figure 11:
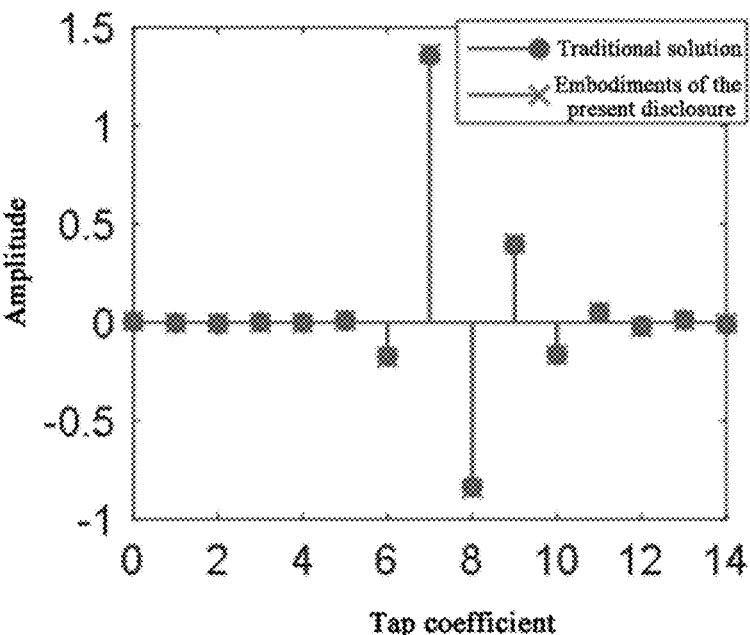
FIG. 11 shows a schematic comparison diagram of a coefficient of an equalizer trained according to an embodiment of the present disclosure and a traditional solution.

FIG. 11 shows a schematic comparison diagram of a coefficient of an equalizer trained according to an embodiment of the present disclosure and a traditional solution. It may be seen from FIG. 11 that an equalizer coefficient trained by using a new preamble in the example of the present disclosure is the same as an equalizer coefficient trained by using an original preamble in the traditional solution, in which a tap difference is negligible. The above verifies that the solution of accelerating training of an equalizer according to the example of the present disclosure may train an optimal equalizer.

Figure 12:
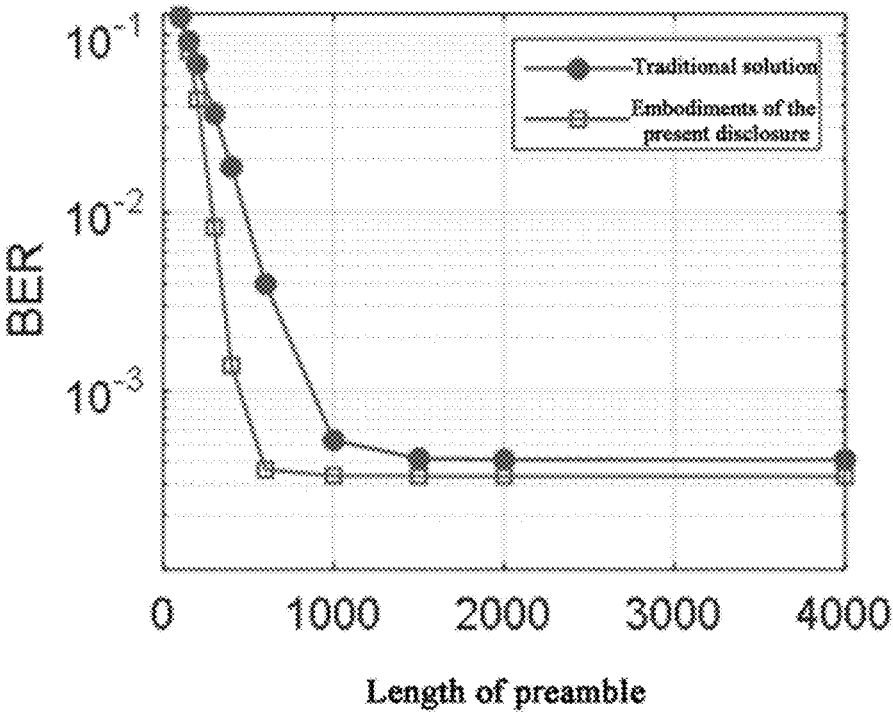
FIG. 12 shows a schematic comparison diagram of a relation between a bit error rate and length of preamble according to an embodiment of the present disclosure and a traditional solution.

FIG. 12 shows a schematic comparison diagram of a relation between a bit error rate and a length of preamble according to an embodiment of the present disclosure and a traditional solution. FIG. 12 shows performance advantages of the example of the present disclosure according to the relation between the bit error rate (BER) and a key performance index (KPI) of a length of preamble. For example, in order to reach a forward error correction (FEC) threshold of 1e-3 (with reference to $10^{-3}$ in an ordinate value in FIG. 12), a preamble of the example of the present disclosure only requires 449 symbols, and a PRBS code exceeds 873 symbols (with reference to an abscissa value in FIG. 12).

In some embodiments, a device capable of performing the method 200 (for example, implementing the method at the transmitter 110) may include an apparatus for performing various steps of the method 200. The apparatus may be implemented in any suitable form. For example, the apparatus may be implemented in a circuit or a software module.

In some embodiments, the apparatus may comprise means for conducting, based on a channel response between the transmitter 110 and a receiver 120, spectral shaping on a first sequence, to obtain an intermediate sequence, the spectral shaping at least partially countering the channel response; means for remapping the intermediate sequence, to obtain a second sequence, the second sequence having less signal levels than the intermediate sequence; and means for transmitting the second sequence to the receiver 120, to train an equalizer of the receiver 120.

In some embodiments, the means for conducting, based on a channel response between the transmitter 110 and a receiver 120, spectral shaping on a first sequence, to obtain an intermediate sequence may be specifically configured to filter the first sequence by using a filter. The filter has a filter parameter determined based on the channel response.

In some embodiments, the apparatus may further comprise means for receiving the filter parameter from the receiver 120.

In some embodiments, the means for receiving the filter parameter from the receiver 120 may be for receiving, from the receiver 120, an index in a look-up table, the look-up table being pre-stored at the transmitter 110 and the receiver 120; and determining the filter parameter based on the look-up table and the index.

In some embodiments, the means for remapping the intermediate sequence, to obtain a second sequence may be specifically for determining a first signal level set of the first sequence; determining a second signal level set of the intermediate sequence; and rounding each signal level of the second signal level set to a signal level of the first signal level set.

In some embodiments, a device capable of performing the method 300 (for example, implementing the method at the receiver 120) may comprise an apparatus for performing various steps of the method 300. The apparatus may be implemented in any suitable form. For example, the apparatus may be implemented in a circuit or a software module.

In some embodiments, the apparatus may comprise means for estimating, a channel response between a transmitter 110 and the receiver 120; means for determining, based on the channel response, a filter parameter of a filter, the filter being to be used by the transmitter 110 for spectral shaping, to at least partially counter the channel response; and means for transmitting the filter parameter to the transmitter 110.

In some embodiments, the means for estimating, a channel response between the transmitter 110 and the receiver 120 may be specifically for estimating the channel response in at least one of the following: determining, based on a serial number of an optical network unit (ONU) associated with the transmitter in a passive optical network (PON), a component bandwidth of the ONU; and determining, based on a ranging result of the ONU by an optical line terminal (OLT) associated with the receiver in the PON, a fiber length between the OLT and the ONU.

In some embodiments, the means for estimating, a channel response between the transmitter 110 and the receiver 120 may be specifically for estimating the channel response in at least one of the following: determining, based on factory calibration data of the receiver associated with an input/output (I/O) interface of a datacenter, a component bandwidth and an S parameter of the receiver; and determining, based on factory calibration data of the transmitter associated with the I/O interface, a component bandwidth and an S parameter of the transmitter.

In some embodiments, the means for transmitting the filter parameter to the transmitter 110 may be specifically for determining, based on the filter parameter, an index indicating the filter parameter in a look-up table, the look-up table being pre-stored at the transmitter and the receiver 120; and transmitting the index to the transmitter 110.

Figure 13:
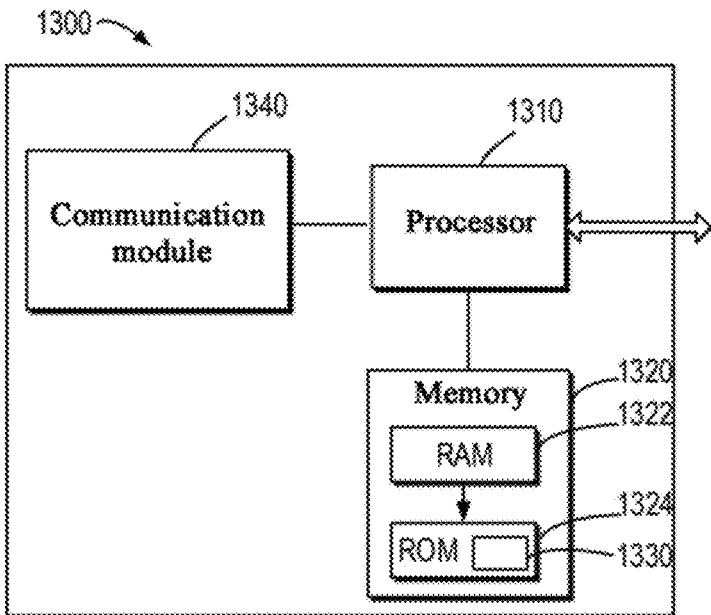
FIG. 13 shows a simplified block diagram of an electronic device suitable for implementing an embodiment of the present disclosure.

FIG. 13 shows a simplified block diagram of an electronic device suitable for implementing an embodiment of the present disclosure. A device 1300 may be provided to implement a communication device. As shown in the figure, the device 1300 comprises one or more processors 1310, one or more memories 1320 coupled to the processor 1310, and one or more communication modules 1340 coupled to the processor 1310.

The communication module 1340 is for bidirectional communication. For example, the communication module 1340 may include a transmitter, a receiver, or a transceiver used for the example of the present disclosure. A communication interface may represent any interface necessary for communication with other network elements.

The processor 1310 may be of any type suitable for a local technical network, and may include, but not limited to, one or more of a general-purpose computer, a special-purpose computer, a microcontroller, a digital signal processor (DSP), and a controller-based multi-core controller architecture. The device 1300 may have a plurality of processors, such as application-specific integrated circuit chips, which are time dependent on a clock synchronized with a main processor.

The memories 1320 may include one or more non-volatile memories and one or more volatile memories. Examples of the non-volatile memory include, but are not limited to, a read-only memory (ROM) 1324, an electrically programmable read only memory (EPROM), a flash memory, a hard disk, a compact disk (CD), a digital video disk (DVD), and other magnetic memories and/or optical memories. Examples of the volatile memory include, but are not limited to, a random access memory (RAM) 1322 and other volatile memories that will not last in the power-down duration.

A computer program 1330 includes a computer-executable instruction executed by an associated processor 1310. The program 1330 may be stored in the ROM 1320. The processor 1310 may perform any suitable actions and processing operations by loading the program 1330 into the RAM 1320.

The embodiments of the present disclosure may be implemented by means of the program 1330, so that the device 1300 may perform any process as discussed in the embodiment of the present disclosure. The embodiments of the present disclosure may also be implemented by hardware or by a combination of software and hardware.

In some embodiments, the program 1330 may be tangibly contained in a computer-readable medium. The computer-readable medium may be included in the device 1300 (such as the memory 1320) or other storage devices accessible by the device 1300. The program 1330 may be loaded into the RAM 1322 from a computer-readable medium for execution. The computer-readable medium may include any type of tangible non-volatile memory, for example, ROM, EPROM, a flash memory, a hard disk, CD, DVD, etc.

Figure 14:
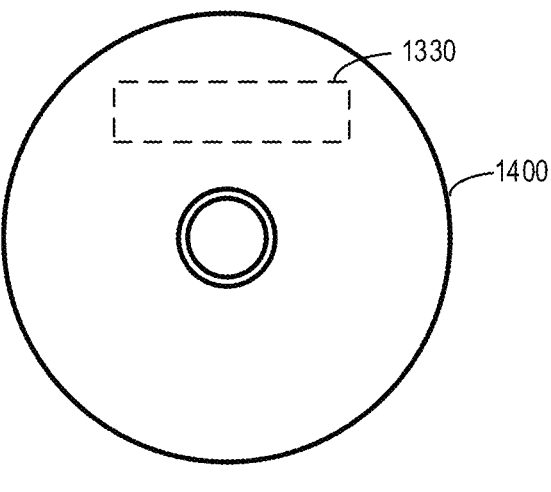
FIG. 14 shows a schematic diagram of a computer-readable medium suitable for implementing an embodiment of the present disclosure.

FIG. 14 shows a schematic diagram of a computer-readable medium suitable for implementing an example of the present disclosure. A specific instance is the computer-readable medium 1400 in the form of CD or DVD. The program 1330 is stored on the computer-readable medium.

Generally, various examples of the present disclosure may be implemented in hardware or private circuits, software, logics or any combination thereof. Some aspects may be implemented by hardware, while other aspects may be implemented by firmware or software and may be executed by a controller, a microprocessor or other computing devices. Although various aspects of the examples of the present disclosure are shown and described as block diagrams, flowcharts, or some other pictorial representations, it is to be understood that the blocks, apparatuses, systems, technologies or methods described herein can be implemented as non-limiting instances such as hardware, software, firmware, dedicated circuits, logics, general-purpose hardware or controllers or other computing devices, or some combination thereof.

The present disclosure further provides at least one computer program product tangibly stored on a non-transitory computer-readable storage medium. The computer program product includes a computer-executable instruction, for example, an instruction included in a program module, which is executed in a device on a target real or virtual processor, to carry out the method according to the example of the present disclosure. Generally, the program module includes a routines, programs, a libraries, objects, classes, components, data structures or the like that performs particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier, so as to enable a device, an apparatus or a processor to execute various processing operations and operations described above. Instances of the carrier include a signal, a computer-readable medium, etc. Instances of the signal may include electrical, optical, radio, sound or other forms of propagated signals, such as carrier waves and infrared signals.

The computer-readable medium may be any tangible medium including or storing a program for or relating to a system, apparatus or device for executing an instruction. The computer-readable medium may be a computer-readable signal medium or a computer-readable storage medium. The computer-readable medium may include, but not limited to, an electronic, magnetic, optical, electromagnetic, infrared, or semiconductor system, apparatus, or device, or their any suitable combination. More detailed instances of the computer-readable storage medium include an electrical connection through one or more wires, a portable computer disk, a hard disk, RAM, ROM, EPROM or a flash memory, an optical storage device, a magnetic storage device, or their any suitable combination.

Further, while operations of the method of the present disclosure are depicted in a particular order in the drawings, it is not required or implied that the operations have to be executed in the particular order, or that all the illustrated operations have to be executed to achieve desired results. On the contrary, an execution order of the steps depicted in the flow diagrams is changeable. Additionally or alternatively, some steps may be omitted. A plurality of steps may be combined into one step for execution, and/or one step may be divided into a plurality of steps for execution. It should be noted that features and functions of the two or more apparatuses according to the present disclosure may be embodied in one apparatus. Conversely, the features and functions of one apparatus described above may be further divided to be embodied by a plurality of apparatuses.

Although the present disclosure has been described with reference to several specific embodiments, it is to be understood that the present disclosure is not limited to the specific embodiments disclosed. The present disclosure is intended to cover various modifications and equivalent arrangements included within the spirit and scope of the appended claims.

We claim:

1. A method for communication, comprising:
conducting, at a transmitter and based on a channel response between the transmitter and a receiver, spectral shaping on a first sequence, to obtain an intermediate sequence, the spectral shaping at least partially countering the channel response;
remapping the intermediate sequence, to obtain a second sequence, the second sequence having fewer signal levels than the intermediate sequence; and
transmitting the second sequence to the receiver, to train an equalizer of the receiver.

2. The method according to claim 1, wherein conducting spectral shaping on the first sequence comprises:
filtering the first sequence by using a filter, the filter having a filter parameter determined based on the channel response.

3. The method according to claim 2, further comprising:
receiving the filter parameter from the receiver.

4. The method according to claim 3, wherein receiving the filter parameter comprises:
receiving, from the receiver, an index in a look-up table, the look-up table being pre-stored at the transmitter and the receiver; and
determining the filter parameter based on the look-up table and the index.

5. The method according to claim 1, wherein remapping the intermediate sequence, to obtain a second sequence comprises:
determining a first signal level set of the first sequence;
determining a second signal level set of the intermediate sequence; and
rounding each signal level of the second signal level set to a signal level of the first signal level set.

6. The method according to claim 1, wherein the first sequence and the second sequence are pulse amplitude modulation sequences having a first number of signal levels; and the intermediate sequence is a sequence having a second number of signal levels, the second number being greater than the first number.

7. The method according to claim 1, wherein the transmitter and the receiver are associated with an optical network unit (ONU) and an optical line terminal (OLT) in a passive optical network (PON), respectively; or the transmitter and the receiver are associated with an input/output (I/O) interface of a datacenter.

8. A device for communication, comprising:

at least one processor; and at least one memory coupled to the at least one processor, the at least one memory comprising instructions stored thereon, the at least one memory and the instructions are further configured, with the at least one processor, to cause the device to perform the method according to claim 1.

9. A method for communication, comprising:

estimating, at a receiver, a channel response between a transmitter and the receiver based on at least one of a component bandwidth of an optical network unit (ONU) or a fiber length between an optical line terminal (OLT) and the ONU, the component bandwidth of the ONU being determined based on a serial number of the ONU, the ONU being associated with the transmitter in a passive optical network (PON), wherein determining the fiber length between the OLT and the ONU is based on a ranging result of the ONU by the OLT, wherein the OLT is associated with the receiver;

determining, based on the channel response, a filter parameter of a filter, the filter being to be used by the transmitter for spectral shaping, to at least partially counter the channel response; and transmitting the filter parameter to the transmitter.

10. The method according to claim 9, wherein estimating the channel response comprises at least one of:

determining, based on factory calibration data of the receiver associated with an input/output (I/O) interface of a datacenter, a component bandwidth and an S parameter of the receiver; or determining, based on factory calibration data of the transmitter associated with the I/O interface, a component bandwidth and an S parameter of the transmitter.

11. The method according to claim 9, wherein transmitting the filter parameter to the transmitter comprises:

determining, based on the filter parameter, an index indicating the filter parameter in a look-up table, the look-up table being pre-stored at the transmitter and the receiver; and transmitting the index to the transmitter.

12. A device for communication, comprising:

at least one processor; and at least one memory coupled to the at least one processor, the at least one memory comprising instructions stored thereon, the at least one memory and the instructions are further configured, with the at least one processor, to cause the device to perform the method according to claim 9.

* * * * *